United States Patent
Fogarty et al.

(10) Patent No.: US 12,453,138 B2
(45) Date of Patent: Oct. 21, 2025

(54) QUANTUM DOT DEVICE

(71) Applicant: QUANTUM MOTION TECHNOLOGIES LIMITED, London (GB)

(72) Inventors: Michael Fogarty, London (GB); John Morton, London (GB)

(73) Assignee: QUANTUM MOTION TECHNOLOGIES LIMITED, London (GB)

( * ) Notice: Subject to any disclaimer, the term of this patent is extended or adjusted under 35 U.S.C. 154(b) by 496 days.

(21) Appl. No.: 17/910,964

(22) PCT Filed: Mar. 12, 2021

(86) PCT No.: PCT/EP2021/056402
§ 371 (c)(1),
(2) Date: Sep. 12, 2022

(87) PCT Pub. No.: WO2021/180958
PCT Pub. Date: Sep. 16, 2021

(65) Prior Publication Data
US 2023/0142559 A1     May 11, 2023

(30) Foreign Application Priority Data
Mar. 13, 2020 (EP) .................................. 20162974

(51) Int. Cl.
*H10D 48/38* (2025.01)
*G06N 10/40* (2022.01)
(Continued)

(52) U.S. Cl.
CPC ........... *H10D 48/383* (2025.01); *G06N 10/40* (2022.01); *H10D 62/83* (2025.01)

(58) Field of Classification Search
None
See application file for complete search history.

(56) References Cited

U.S. PATENT DOCUMENTS 5,571,376 A * 11/1996 Bestwick ............. H10D 62/813
                                                     438/43
2013/0087766 A1    4/2013   Schenkel et al.
(Continued)

FOREIGN PATENT DOCUMENTS

EP         3082073 A1    10/2016
FR         3068519 A1    1/2019
(Continued)

OTHER PUBLICATIONS

Hwang et al., "Impact of g-factors and valleys on spin qubits in a silicon double quantum dot," Centre for Quantum Computation and Communication Technology, School of Electrical Engineering and Telecommunications, Aug. 30, 2016, Phys. Rev. B 96, 045302 (2017), https://doi.org/10.48550/arXiv.1608.07748.
(Continued)

*Primary Examiner* — Bilkis Jahan
(74) *Attorney, Agent, or Firm* — Fletcher Yoder, P.C.

(57) ABSTRACT

A silicon-based quantum device for confining charge carriers is provided. The device comprises: a substrate having a first planar region 137; a silicon layer 32 which forms part of the substrate and includes a step 33 with an edge 34 and a second planar region 135, wherein the second planar region 135 is substantially parallel to and offset from the first planar region 137; a first electrically insulating layer 42 provided on the silicon layer 32, overlying the step 33; a first metallic layer 51, provided on the first electrically insulating layer 42, overlying the step 33, arranged to be electrically connected such that a first confinement region 10 can be induced in which a charge carrier or charge carriers can be confined at the edge 34; and a second metallic layer 52, provided overlying the second planar region 135 of the silicon layer, wherein the second metallic layer is: electrically separated from the first metallic layer 51; and arranged to be electrically connected such that a second confinement (Continued)

region 11 can be induced in which a charge carrier or charge carriers can be confined only in the second planar region 135 of the silicon layer 32 under the second metallic layer 52, and the first confinement region 10 is couplable to the second confinement region 11; wherein the first confinement region 10 is displaced from the second confinement region 11 in a direction that is perpendicular to the edge 34. A method of assembling a silicon-based quantum device and a method of using a silicon-based quantum device are also provided.

15 Claims, 6 Drawing Sheets

(51) Int. Cl.
*H10D 48/00* (2025.01)
*H10D 62/83* (2025.01)

(56) References Cited

U.S. PATENT DOCUMENTS

| | | | | |
|---|---|---|---|---|
| 2016/0300155 | A1* | 10/2016 | Betz | H10N 60/805 |
| 2019/0043822 | A1* | 2/2019 | Falcon | H01L 24/29 |
| 2019/0043973 | A1* | 2/2019 | George | H10D 62/126 |
| 2019/0164959 | A1* | 5/2019 | Thomas | B82Y 10/00 |
| 2019/0206991 | A1* | 7/2019 | Pillarisetty | H10D 48/383 |
| 2019/0229189 | A1* | 7/2019 | Clarke | H10D 64/518 |
| 2019/0259850 | A1* | 8/2019 | Pillarisetty | H10D 30/6219 |
| 2019/0266509 | A1* | 8/2019 | Hutin | H10D 48/3835 |
| 2019/0266511 | A1* | 8/2019 | Pillarisetty | H10D 48/30 |
| 2019/0341459 | A1* | 11/2019 | Pillarisetty | H10D 64/518 |
| 2019/0363181 | A1* | 11/2019 | Pillarisetty | H10D 30/6748 |

FOREIGN PATENT DOCUMENTS

| | | |
|---|---|---|
| TW | 564505 B | 12/2003 |
| TW | 200519379 A | 6/2005 |
| TW | 200636933 A | 10/2006 |
| WO | 2019081837 A1 | 5/2019 |

OTHER PUBLICATIONS

TW Office Action for TW Application No. 110109008, Mailed Feb. 27, 2024, 7 pages.

* cited by examiner

QUANTUM DOT DEVICE

FOREIGN PRIORITY INFORMATION

This application claims priority to PCT application number PCT/EP2021/056402, filed Mar. 12, 2021, which claims priority to European patent application number 20162974.8, filed Mar. 13, 2020.

FIELD OF THE INVENTION

The present invention relates to a silicon-based quantum device for quantum computation.

BACKGROUND TO THE INVENTION

Realisation of a quantum computer requires large numbers of qubits. In the near-term intermediate-scale quantum computing, or NISQ, era, quantum computational processes may use 50-100 qubits.

A qubit, or a quantum bit, is the quantum parallel to the classical "bit" used in classical computing. Qubits contain information, and quantum computation involves the manipulation and processing of qubits. In order to perform complex computational processes, large numbers of qubits are used.

A qubit can be based on a quantum dot, which is a quantum confinement structure in which a charge carrier such as an electron or a hole can be electrostatically confined in three dimensions. The state of the electron (or hole) provides the information. There are a number of ways of providing confinement in three dimensions. For example, a combination of geometry and gating can be used as is the case for silicon nanowire (SiNW) quantum dots. A voltage can be applied to a narrow strip of conductive material (a "gate") lying perpendicularly on top of an insulated SiNW to induce a quantum dot in the corner of the SiNW. The corner of the SiNW provides confinement in two dimensions, and the gate provides confinement in the third dimension.

Multiple quantum dots can be positioned along the SiNW to create a one dimensional array of quantum dots. However, this architecture is very limiting.

It is desirable to create a scalable architecture for use in quantum computing.

SUMMARY OF THE INVENTION

An aspect of the invention provides a silicon-based quantum device for confining charge carriers. The device comprises a substrate having a first planar region and a silicon layer which forms part of the substrate. The silicon layer includes a step with an edge and a second planar region, wherein the second planar region is substantially parallel to and offset from the first planar region. A first electrically insulating layer is provided on the silicon layer, overlying the step. A first metallic layer is provided on the first electrically insulating layer, overlying the step, and is arranged to be electrically connected such that a first confinement region can be induced in which a charge carrier or charge carriers can be confined at the edge. A second metallic layer is provided overlying the second planar region of the silicon layer. The second metallic layer is electrically separated from the first metallic layer; and is arranged to be electrically connected such that a second confinement region can be induced in which a charge carrier or charge carriers can be confined only in the second planar region of the silicon layer under the second metallic layer, and the first confinement region is couplable to the second confinement region. The first confinement region is displaced from the second confinement region in a direction that is perpendicular to the edge.

Using the silicon-based quantum device as described above, a first confinement region can be induced at the edge by applying a bias potential to the first metallic layer. Optionally the first confinement region may be a quantum dot, and the confined charge carrier or charge carriers may represent quantum information in the form of qubits, or may provide an exchange of quantum information in the form of mediators. A bias potential is typically a fixed voltage, and can be used to vary the charge carrier occupation within the device. The charge carrier may be an electron or a hole. A charge carrier is typically confined using the corner of the step and the width of the first metallic layer, and the charging energy of the quantum dot, i.e. the energy required to add or remove a single charge carrier from the dot, can be tuned by adjusting the width. A wider first metallic layer typically has a lower charging energy. The width is measured along the edge of the step. The positioning of the first metallic layer overlying the step is advantageous as the corner of the step can provide effective spatial confinement in two dimensions. The induced quantum dot may confine a defined number of charge carriers. Optionally, the first metallic layer extends laterally along the edge such that an elongate quantum dot can be induced at the edge. An elongate quantum dot may be more suited to the mediation of qubit interactions and can therefore be beneficially placed within the device architecture.

A second confinement region can be supported in the second planar region of the silicon layer under the second metallic layer when a bias potential is applied to the second metallic layer. A charge carrier or charge carriers can be confined only in the second planar region of the silicon layer. The second confinement region can be coupled to the first confinement region. Advantageously, this architecture provides good charge stability, and quantum computational processes involving the confinement regions are typically more resilient to charge errors. Furthermore, the second confinement region may facilitate the initialisation of the first confinement region, and allow the population of the first confinement region to be maintained.

The first confinement region is displaced from the second confinement region in a direction that is perpendicular to the edge. The first confinement region may be laterally separated from the second confinement region by up to 100 nanometres. The displacement is substantially perpendicular to the edge. However, it is to be understood that there may be some angular variation in the displacement without loss of functionality. Typically, the displacement of the second confinement region with respect to the first confinement region is achieved by providing a displacement between the second metallic layer and the first metallic layer in a direction that is perpendicular to the edge. The first and second metallic layers are arranged to be electrically connected to induce first and second confinement regions respectively, and therefore the substantially perpendicular nature of the displacement between first and second confinement regions also applies to the displacement between first and second metallic layers.

The silicon layer comprises a planar region, and the second confinement region is provided in the planar region of the silicon layer. The first confinement region is preferably coupled to the second confinement region by proximity. This provides a direct coupling between the first and second confinement regions. The second metallic layer is provided overlying the second planar region of the silicon layer. The second planar region is a substantially flat portion of the silicon layer and the second metallic layer may be provided overlying only the substantially flat portion of the silicon layer. The substantially flat portion of the silicon layer may have minor deviations due to the natural roughness of the silicon substrate. In the device, the substantially flat portion is typically an un-etched portion of the silicon layer. The substantially flat portion of the silicon layer is distinguished from the stepped portion which has an edge. The second confinement region may for example be in a two dimensional planar channel such as a planar quantum dot structure, an inversion channel, an implantation region or a metal-oxide-semiconductor field-effect transistor (MOSFET).

The second metallic layer may be provided on the first electrically insulating layer. In one example, the first and second metallic layers are spatially separated to provide an electrical separation. This arrangement advantageously reduces the number of manufacturing steps required, as the first and second metallic layers can be deposited simultaneously. In another example, the second metallic layer may be arranged to be in ohmic contact with the silicon layer such that an ohmic region is induced in the silicon layer. This ohmic region provides a second confinement region which is couplable to the first confinement region.

In another example, the electrical separation between the first and second metallic layers may be achieved using a barrier layer. A second electrically insulating layer provided on the first metallic layer optionally forms an electrical barrier layer upon which the second metallic layer can be arranged. Advantageously, the second metallic layer does not need to be precisely aligned using this device structure. The second metallic layer can optionally overly the first metallic layer, and may also extend to overly the step without affecting the electrical performance of the device. Preferably, the second metallic layer is electrically communicative with the silicon layer to support the charge carrier reservoir only in a flat, plateau, region of the silicon layer. The electric field arising from the application of a bias to the second metallic layer preferably only provides doping in a flat region of the silicon layer.

The first confinement region and the second confinement region are couplable. Optionally, the first and second confinement regions are couplable with a tuneable coupling strength. The device may further comprise a first tuning metallic layer positioned between the first metallic layer and the second metallic layer. Preferably the first tuning metallic layer is electrically isolated from the first metallic layer and the second metallic layer. This may be achieved by providing a dielectric layer between the first and second metallic layers and the first tuning metallic layer. Optionally, the first tuning metallic layer is operable to tune the coupling strength between the first confinement region and the second confinement region. The coupling strength may be tuned by applying a bias potential to the first tuning metallic layer. The first tuning metallic layer advantageously can provide selective coupling and decoupling between the first and second metallic layers. The first tuning metallic layer may provide coupling by mediation as an alternative to coupling by proximity.

The first tuning metallic layer is typically positioned between the first and second metallic layers. The first tuning metallic layer preferably directly contacts the dielectric layer covering the edge of the first and second metallic layers, and optionally overlies one or both of the first and second metallic layers. The first tuning metallic layer is preferably arranged such that the tunnel coupling between the first tuning metallic layer and the first metallic layer, and the tunnel coupling between the first tuning metallic layer and the second metallic layer, can be adjusted such that the first tuning metallic layer provides tuneable coupling between the first and second metallic layers. The first tuning metallic layer may provide electrode moderated coupling between charge confinement regions through use of a barrier electrode.

The silicon-based quantum device optionally comprises a plurality of first metallic layers. For example, a first first metallic layer may be arranged to be electrically connected so as to induce a first first confinement region; and a second first metallic layer may be arranged to be electrically connected so as to induce a second first confinement region. Typically, the first first metallic layer and the second first metallic layer are electrically separated from each other. Typically, the electrical separation is achieved by a displacement along the edge. Optionally, the first and second first confinement regions are couplable with a tuneable coupling strength. Each of the first and second first confinement regions may be a quantum dot for a qubit. Tuning of the coupling strength advantageously may allow adjacent first confinement regions to be coupled or decoupled. Coupled quantum dots may enable a two-qubit interaction between neighbouring qubits in adjacent first confinement regions.

A second tuning metallic layer may be provided between the first first metallic layer and the second first metallic layer. Preferably, the second tuning metallic layer is electrically separated from the first first metallic layer and the second first metallic layer. This may be achieved by providing a dielectric layer between the first and second first metallic layers and the second tuning metallic layer. The second tuning metallic layer is preferably arranged such that the tunnel coupling between the second tuning metallic layer and the first and second first metallic layers respectively can be adjusted such that the second tuning metallic layer provides tuneable coupling between the first and second first metallic layers. This may be achieved by extending the second tuning metallic layer such that it makes direct contact with the edges of the dielectric layer covering the first and second first metallic layers. Alternatively the second tuning metallic layer may be positioned overlying one or both of the first and second first metallic layers.

Optionally, the second tuning metallic layer is operable to tune the coupling strength between the first first confinement region and the second first confinement region. Selective coupling and decoupling of neighbouring first confinement regions beneficially provides flexibility to the quantum computational processes which can be implemented using the quantum device.

Optionally, a plurality of first and/or second tuning metallic layers are provided between adjacent metallic layers. The coupling strength between the corresponding adjacent confinement regions may be tuned accordingly.

The silicon-based quantum device may be formed from a silicon substrate, or more preferably from a silicon-on-insulator (SOI) substrate. An SOI substrate is a layered silicon-insulator-silicon structure in which the insulator is typically silicon dioxide or aluminium oxide. The step in the silicon layer is preferably formed by selectively etching the substrate. As such, the silicon layer forms part of the substrate. Although a silicon wafer is typically cheaper, a benefit of using an SOI substrate is that the depth of the etched portions is typically more reliable. For example, the etch process may more easily etch silicon than silicon dioxide. Preferably, the etch depth is the full depth of the uppermost silicon layer in the SOI substrate. The device may further comprise a third electrically insulating layer beneath the silicon layer comprising quantum confinement regions. The third electrically insulating layer is preferably the insulating layer of the SOI substrate, and thus the device typically further comprises an additional silicon layer beneath the third electrically insulating layer.

Typically the electrically insulating material of an SOI substrate is silicon dioxide or aluminium oxide, and therefore the third electrically insulating layer is preferably formed from silicon dioxide or aluminium oxide. The first electrically insulating layer provided on the silicon layer overlying the step may be formed from any suitable dielectric material such as silicon dioxide, aluminium oxide, or hafnium oxide. Similarly, the second electrically insulating layer optionally provided on the first metallic layer may be formed from any suitable dielectric material such as those listed above. The first and second electrically insulating layers may be formed from the same material or different materials.

The first and second metallic layers preferably comprise a conductive material. Typically, the conductive material may be poly-silicon or a metal such as gold or titanium or tungsten. However, any conductive material may be used, or any combination of conductive materials. For example, a first portion of the first metallic layer contacting the first electrically insulating layer may be formed from poly-silicon, and a second portion of the first metallic layer contacting the first portion may be formed from a metal.

Typically, the first and second metallic layers are in electrical contact with a first and second conductive via respectively. The first and second conductive vias may be formed from any conductive material. Typically the first and second conductive vias may comprise a metal, or alternatively may comprise poly-silicon. A via is a vertical interconnect access and typically extends perpendicular from the substrate. Silicon-based quantum devices suitable for confining charge carriers typically require a bias to be applied to a small region within the device. Although electrical pathways can be extended parallel to the substrate, these structures are not scalable and do not allow for a dense two dimensional arrangement of quantum dots and other quantum confinement regions. A via provides a vertical electrical connection which advantageously allows the implementation of a dense two dimensional architecture.

Embodiments of the invention provide a suitable building block for creating dense two dimensional architectures which are scalable. The step in the silicon layer may comprise at least a first edge and a second edge, which typically subtend a non-zero angle with respect to one another. The first metallic layer may overly the first edge of the step and is preferably arranged to be electrically connected such that an elongate quantum dot can be induced in a first confinement region at the first edge. The device may further comprise a third metallic layer, which may be provided on the first electrically insulating layer overlying the second edge of the step, and is preferably arranged to be electrically connected such that a quantum dot can be induced in a first confinement region at the second edge.

The first confinement region at the second edge may be suitable for confining a qubit, and the first confinement region at the first edge may be suitable for providing an exchange region, or a mediator dot. Optionally, a mediator dot provides an exchange of quantum information between qubits. Preferably the width of the first metallic layer, measured along the edge, is less than 1 micron, and more preferably the width is less than 500 nanometres. The mediator dot optionally provides an exchange of information between qubits, and as such the width of the first metallic layer is small enough such that the quantum information being exchanged is preserved.

Preferably, a two dimensional architecture provides direct coupling between a charge carrier reservoir and a mediator dot and direct coupling between a mediator dot and a quantum dot. Quantum dots optionally support qubits which may carry quantum information for use in a quantum computation. These qubits are preferably addressable and controllable using a charge carrier reservoir. Proximity coupling, or electrode moderated coupling, can be provided between a reservoir, a mediator dot, and a quantum dot such that each quantum dot may be separated from a reservoir by no more than one mediator dot. The architecture may feasibly be scaled up without loss of control of the qubits, in particular the initialisation or the manipulation of the state of the qubits.

Optionally, several first confinement regions can be induced in a row at the edge of the silicon layer to create a one dimensional array of first confinement regions. The first metallic layer may comprise a number of electrodes, wherein each electrode overlies the step and is spatially separated from other electrodes within the first metallic layer. A bias can be applied to each electrode in order to induce a first confinement region, or a quantum dot, beneath the respective electrode at the edge of the silicon layer. The width of each electrode may determine the boundaries of electrostatic confinement. However, a one dimensional array of quantum dots is limiting as a portion of the quantum dots will typically be separated from a charge carrier reservoir and therefore their state will be hard to control.

Preferably, the silicon-based quantum device comprises a two dimensional array of quantum dots confined in first confinement regions. It is particularly desirable to position a charge carrier reservoir close to a quantum dot, as a quantum dot which is far away from a charge carrier reservoir is harder to control. Control may involve preparation of an initial qubit state, or manipulation of a qubit from one state to another, for example. An advantage of the two dimensional architecture in this invention is the proximity of the reservoirs, or second confinement regions, to the quantum dots, or first confinement regions, along with a dense arrangement of quantum dots.

In order to provide a scalable two dimensional architecture, the device preferably further comprises a plurality of first metallic layers and a plurality of third metallic layers. The width of the first metallic layers along the edge of the silicon layer is preferably suitable for inducing an elongate dot. The width of the third metallic layers along the edge of the silicon layer is preferably suitable for inducing a quantum dot. Preferably, the plurality of first metallic layers are configured to induce corresponding elongate quantum dots at respective edges of the step in the silicon layer and the plurality of third metallic layers are configured to induce corresponding quantum dots at respective edges of the step in the silicon layer. Optionally, each first metallic layer may be adjacent to two separate third metallic layers such that each mediator dot may be couplable to two quantum dots.

This device structure can advantageously be used to provide a scalable two dimensional architecture with good control of qubits. The scaling up of this architecture may involve, for example, a polygonal step comprising a plurality of edges. The step may be formed for example from a mixture of long and short edges, and the first metallic layers may be arranged on the long edges and the third metallic layers may be arranged on the short edges. For example, the scalable structure may comprises a number of plateau regions connected by nanowire regions. Optionally, the plateau region may comprise a plurality of long edges, and the nanowire regions may comprise two short edges separated by a narrow flat region. One or more second metallic layers may be arranged overlying substantially flat portions of the plateau region so as to induce respective second confinement regions beneath the plateau. Typically each of the one or more second metallic layers only overly the substantially flat portions of the plateau region. For example, each first metallic layer may be coupled to a respective second confinement region. Optionally, additional metallic layers may be provided on substantially flat portions of the plateau region to provide further confinement regions. This architecture may feasibly be scaled up without loss of control of the qubits.

Further aspects of the invention will now be described. Any features discussed in connection with one aspect are equally applicable in respect of the remaining features and each aspect shares similar advantages. Preferable features of the device may advantageously be incorporated into a method of assembly or method of use, and preferable features of the assembly and use methods may advantageously be incorporated into the device.

Another aspect of the invention provides a method of assembling a silicon-based quantum device according to the first aspect. The method comprises providing a substrate having a first planar region and etching the substrate to form a silicon layer including a step with an edge and a second planar region. The second planar region is substantially parallel to and offset from the first planar region. The etching step creates a partial silicon layer. After etching the silicon layer, a first electrically insulating layer is deposited on the silicon layer, overlying the step. The method further comprises depositing first and second metallic layers. The first metallic layer is deposited on the first electrically insulating layer, overlying the step, and is configured to be electrically connected such that a charge carrier or charge carriers can be confined in a first confinement region at the edge. The second metallic layer is deposited on the second planar region of the silicon layer, and is deposited such that it is electrically separate from the first metallic layer. The second metallic layer is configured to be electrically connected such that a charge carrier or charge carriers can be confined in a second confinement region only in the second planar region of the silicon layer under the second metallic layer. The second metallic layer is configured to be electrically connected such that the first confinement region is couplable to the second confinement region.

The etched silicon layer comprises an edge and a substantially planar region. The second metallic layer is preferably deposited overlying the substantially planar region. More preferably, the second metallic layer is deposited overlying the substantially planar region only. Application of a bias to the second metallic layer overlying a planar region advantageously induces a second confinement region in the form of a planar charge carrier reservoir in the silicon layer.

In one example, the first and second metallic layers are deposited simultaneously. This advantageously reduces the number of steps required to assemble the silicon-based quantum device. The first and second metallic layers may be deposited as two laterally separated metallic layers using a masking material. Alternatively, the first and second metallic layers may be deposited as a joined metallic layer, and then divided into two electrically separate metallic layers by removing a portion of the joined metallic layer.

In another example, the method further comprises depositing a second electrically insulating layer on the first metallic layer. The second metallic layer is then preferably deposited on the second electrically insulating layer. The second electrically insulating layer may provide an electrostatic barrier between the first and second metallic layers in order to provide electrical separation.

The silicon-based quantum device is preferably assembled using silicon metal-oxide semiconductor, or SiMOS, fabrication processes.

An additional aspect of the invention provides a method of using a silicon-based quantum device according to the first aspect. The method comprises applying a first bias potential to the first metallic layer to confine a charge carrier or charge carriers in a first confinement region, and applying a second bias potential to the second metallic layer to confine a charge carrier or charge carriers in a second confinement region, wherein the second confinement region is only in the second planar region of the silicon layer under the second metallic layer. The magnitudes of the first and second bias potentials are configured such that the first and second confinement regions are coupled. The coupling may be by proximity, or may be moderated by a tuning electrode.

Typically the second bias potential is larger than the first bias potential. The first and second bias potentials may be adjusted to modify the carrier occupations of the first and second confinement regions respectively. Increasing the second bias potential preferably increases the strength of the coupling between the first and second confinement regions.

An aspect of the invention provides a silicon-based quantum device for confining charge carriers. The device comprises a silicon layer which includes a step with an edge. A first electrically insulating layer is provided on the silicon layer, overlying the step. A first metallic layer is provided on the first electrically insulating layer, overlying the step, and is arranged to be electrically connected such that a first confinement region can be induced in which a charge carrier or charge carriers can be confined at the edge. A second metallic layer is provided overlying a substantially flat portion of the silicon layer. The second metallic layer is electrically separated from the first metallic layer; and is arranged to be electrically connected such that a second confinement region can be induced in which a charge carrier or charge carriers can be confined in the silicon layer under the second metallic layer, and the first confinement region is couplable to the second confinement region. The first confinement region is displaced from the second confinement region in a direction that is perpendicular to the edge.

A second confinement region can be supported in the silicon layer under the second metallic layer when a bias potential is applied to the second metallic layer. The second confinement region can be coupled to the first confinement region. Advantageously, this architecture provides good charge stability, and quantum computational processes involving the confinement regions are typically more resilient to charge errors. Furthermore, the second confinement region may facilitate the initialisation of the first confinement region, and allow the population of the first confinement region to be maintained.

The silicon layer typically comprises a planar region, and the second confinement region may be provided in the planar region. The first confinement region is preferably coupled to the second confinement region by proximity. This provides a direct coupling between the first and second confinement regions. The second metallic layer is provided overlying a substantially flat portion of the silicon layer. The substantially flat portion of the silicon layer may have minor deviations due to the natural roughness of the silicon substrate. In the device, the substantially flat portion is typically an un-etched portion of the silicon layer. The substantially flat portion of the silicon layer is distinguished from the stepped portion which has an edge. The second confinement region may for example be in a two dimensional planar channel such as a planar quantum dot structure, an inversion channel, an implantation region or a metal-oxide-semiconductor field-effect transistor (MOSFET).

The silicon-based quantum device may be formed from a silicon substrate, or more preferably from a silicon-on-insulator (SOI) substrate. An SOI substrate is a layered silicon-insulator-silicon structure in which the insulator is typically silicon dioxide or aluminium oxide. The step in the silicon layer is preferably formed by selectively etching the substrate. Although a silicon wafer is typically cheaper, a benefit of using an SOI substrate is that the depth of the etched portions is typically more reliable. For example, the etch process may more easily etch silicon than silicon dioxide. Preferably, the etch depth is the full depth of the uppermost silicon layer in the SOI substrate. The device may further comprise a third electrically insulating layer beneath the silicon layer comprising quantum confinement regions. The third electrically insulating layer is preferably the insulating layer of the SOI substrate, and thus the device typically further comprises an additional silicon layer beneath the third electrically insulating layer.

Another aspect of the invention provides a method of assembling a silicon-based quantum device according to the first aspect. The method comprises etching a silicon layer to form a step with an edge. This creates a partial silicon layer. After etching the silicon layer, a first electrically insulating layer is deposited on the silicon layer, overlying the step. The method further comprises depositing first and second metallic layers. The first metallic layer is deposited on the first electrically insulating layer, overlying the step, and is configured to be electrically connected such that a charge carrier or charge carriers can be confined in a first confinement region at the edge. The second metallic layer is deposited on a substantially flat portion of the silicon layer, and is deposited such that it is electrically separate from the first metallic layer. The second metallic layer is configured to be electrically connected such that a charge carrier or charge carriers can be confined in a second confinement region in the silicon layer under the second metallic layer. The second metallic layer is configured to be electrically connected such that the first confinement region is couplable to the second confinement region.

The etched silicon layer comprises an edge and generally comprises a substantially planar region. The second metallic layer is preferably deposited overlying the substantially planar region. Application of a bias to the second metallic layer overlying a planar region advantageously induces a second confinement region in the form of a planar charge carrier reservoir in the silicon layer.

An additional aspect of the invention provides a method of using a silicon-based quantum device according to the first aspect. The method comprises applying a first bias potential to the first metallic layer to confine a charge carrier or charge carriers in a first confinement region, and applying a second bias potential to the second metallic layer to confine a charge carrier or charge carriers in a second confinement region. The magnitudes of the first and second bias potentials are configured such that the first and second confinement regions are coupled. The coupling may be by proximity, or may be moderated by a tuning electrode.

BRIEF DESCRIPTION OF THE DRAWINGS

Embodiments of the invention will now be described with reference to the accompanying drawings in which.

DETAILED DESCRIPTION

Figure 1:
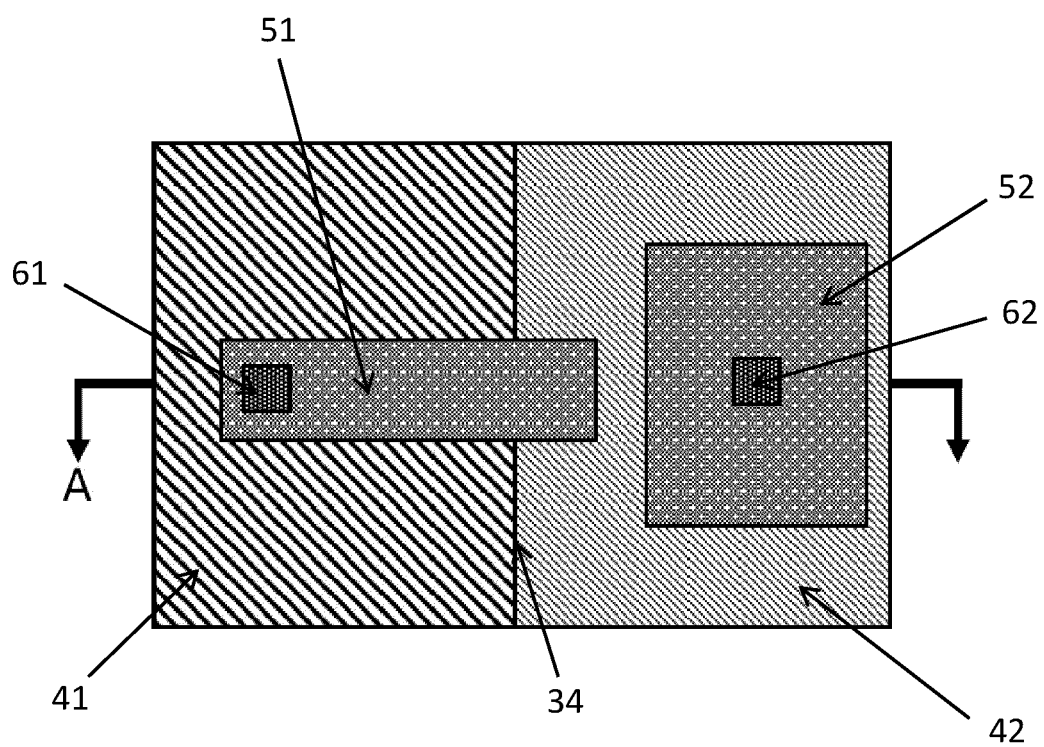
FIG. 1 is a top view of a silicon-based quantum device in accordance with a first embodiment of the invention.
Figure 2:
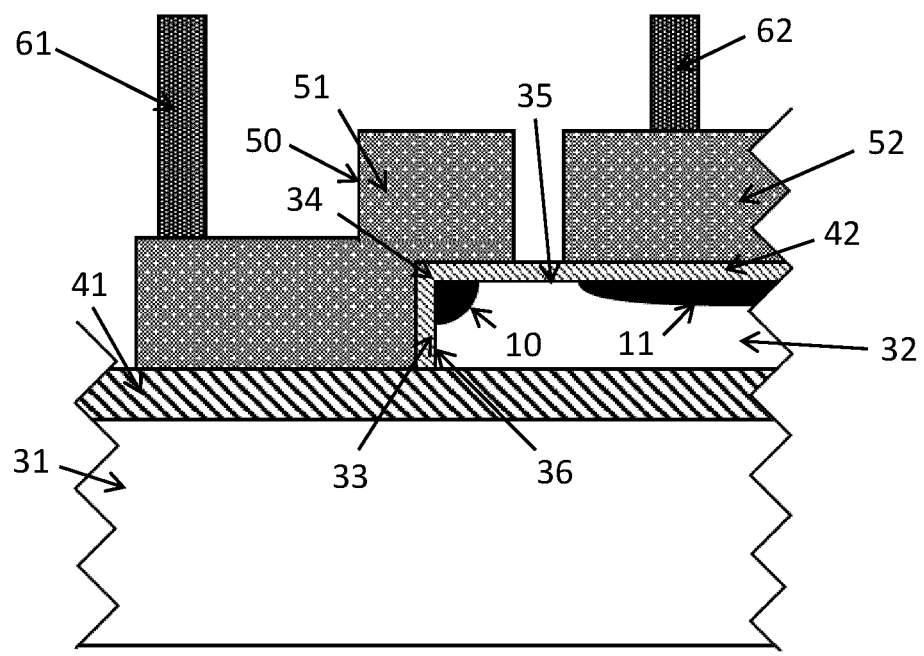
FIG. 2 is a cross-sectional side view of a silicon-based quantum device in accordance with the first embodiment of the invention.

FIGS. 1 and 2 schematically illustrate a silicon-based quantum device according to a first embodiment. The silicon-based quantum device is made using silicon metal-oxide semiconductor, or SiMOS, fabrication processes. FIG. 1 shows a top view and FIG. 2 shows a cross-sectional side view along the direction A indicated in FIG. 1. FIG. 1 shows first and second conductive vias 61, 62 contacting first and second metallic layers 51, 52 respectively. In this embodiment the first and second conductive vias 61, 62 are formed from a metal such as gold, titanium, tungsten, copper, or aluminium, and the first and second metallic layers 51, 52 are formed from conductive poly-silicon. In alternative embodiments the first and second metallic layers 51, 52 and the first and second conductive vias 61, 62 can be formed from any conductive material.

The second metallic layer 52 is arranged on a thin dielectric layer 42 which covers a partial silicon layer 32 (shown in FIG. 2). The partial silicon layer 32 is substantially flat. The second metallic layer 52 does not extend beyond the partial silicon layer 32. The first metallic layer 51 covers both the thin dielectric layer 42 and a thick dielectric layer 41. In this embodiment, the first and second metallic layers 51, 52 are laterally separated by approximately 10 nanometres. In other embodiments, the separation can be up to 100 nanometres. The spatial separation provides an electrical separation between the first and second metallic layers 51, 52.

In FIG. 2, it can be seen that the first metallic layer 51 overlying both the thin dielectric layer 42 and the thick dielectric layer 41 is arranged on top of a step 33 formed in a partial silicon layer 32. The first metallic layer 51 is schematically illustrated with a corresponding step 50. The first metallic layer 51 may be deposited by evaporation of a metallic substance, which results in a metallic layer with a substantially uniform thickness relative to the underlying surface. Prominent features, such as the step 33 in the partial silicon layer 32, may therefore be reproduced in layers overlying the step 33.

The partial silicon layer 32 comprises a planar region 35 which may extend several microns, or even several millimetres from the step 33. In another embodiment, the planar region terminates in another step upon which another metallic layer is provided.

The step 33 at the edge of the partial silicon layer 32 is formed from two orthogonal surfaces 35, 36 within the partial silicon layer 32. The planar region 35 and a vertical region 36 meet at the edge 34. The planar region 35 and the vertical region 36 are substantially planar. The planar and vertical regions 35, 36 are substantially orthogonal. The interior angle between the planar and vertical regions 35, 36 is between 60 and 135 degrees, preferably between 80 and 100 degrees, and more preferably between 85 and 95 degrees. The angle typically depends on the etching technique employed. For example, a smaller interior angle may be achieved using a wet etching process, whereas an angle closer to the perpendicular may be achieved using a dry etching process. A smaller interior angle advantageously provides greater charge confinement.

In this embodiment, a silicon-on-insulator (SOI) substrate comprising a lower silicon layer, an intermediate insulator layer and an upper silicon layer is used. A thick dielectric layer 41, formed from silicon dioxide, $SiO_2$, is provided on the lower silicon layer 31, and is the intermediate insulator layer of the SOI wafer. The $SiO_2$ layer is between 0.2 and 3 microns. In alternative embodiments, any suitable insulating material may be chosen. The partial silicon layer 32 provided on the thick dielectric layer 41 is formed by performing a selective etching process on the upper silicon layer of the SOI substrate. The etching process may be performed physically or chemically. The interior angle between the planar and vertical regions 35, 36 of the partial silicon layer 32 may depend on the etching parameters. In this embodiment, portions of the upper silicon layer of the SOI wafer are etched to form a step 33. The height of the step 33 is the same as the depth of the upper silicon layer of the SOI wafer, which may be between 20 and 200 nanometres. A thin dielectric layer 42 is provided on the partial silicon layer 32 overlying the step 33. The thin dielectric layer 42 is formed from $SiO_2$ and is between 1 and 30 nanometres thick, and preferably is approximately 10 nanometres thick. The thin dielectric layer 42 may be a native oxide or a thermal oxide. In alternative embodiments, the thin dielectric layer may be formed from any suitable dielectric material and may be deposited by atomic layer deposition.

First and second conductive vias 61, 62, or vertical interconnect accesses, are electrically connected to the first and second metallic layers 51, 52 respectively and can be used to connect the first and second metallic layers 51, 52 to sourcing and/or measuring equipment. The sourcing and/or measuring equipment is capable of sourcing and/or measuring electrical data such as voltages, currents, capacitances, resistances, or conductances. The first and second metallic layers 51, 52 are electrically distinct. In FIG. 2, the first conductive via 61 is shown to contact the first metallic layer 51 at one end of the first metallic layer, and the second conductive via 61 is shown to contact the second metallic layer 52 in the centre of the second metallic layer. In alternative embodiments, the first and second conductive vias 61, 62 may be positioned at any point on the respective first and second metallic layers 51, 52. The application of a bias to a conductive via electrically connected to a metallic layer results in a substantially uniform electric field beneath the metallic layer.

First and second confinement regions 10, 11 in the silicon-based quantum device are shown schematically. The step 33 at the edge of the partial silicon layer 32 has a corner 34 in which a first confinement region 10 can be induced when a bias (i.e. a DC voltage) is applied to the first metallic layer 51 through the first conductive via 61. In this embodiment the first confinement region is a quantum dot. A quantum dot 10 is a quantum confinement structure in which electrons or holes can be electrostatically confined in three dimensions. In this embodiment, confinement in two dimensions is achieved by the edge 34, and the width of the first metallic layer 51 provides confinement in a third dimension. The width, as measured along the edge 34, of the first metallic layer 51 is typically between 10 and 2000 nanometres depending on the desired charging energy and architectural constraints. In FIGS. 1 and 2, the length of the first metallic layer 51, measured along direction A, is substantially greater than its width. However, its length does not affect the charge carrier confinement in the quantum dot 10 and can be chosen according to the desired device architecture.

A second confinement region 11 can be supported in a planar region of the partial silicon layer 32 when a bias is applied to the second metallic layer 52 through the second conductive via 62. The second confinement region 11 is only in the planar region of the partial silicon layer 32. The second confinement region may be a reservoir of charge carriers such as an electron reservoir or a hole reservoir. The second metallic layer 52 is substantially larger than the first metallic layer 51. The dimensions of the second metallic layer 52 affect the size of the charge carrier reservoir. The dimensions of the second metallic layer 52 are typically chosen such that a two dimensional charge carrier reservoir can be supported beneath the second metallic layer 52. Confinement in one dimension arises at the interface between the partial silicon layer 32 and the thin dielectric layer 42. Reduction of the width or length of the second metallic layer 52 may result in confinement in a second dimension such that the charge carriers are confined in a quasi-one dimensional structure in the partial silicon layer 32, and reduction of both the width and length of the second metallic layer 52 may result in confinement in all three dimensions such that the charge carriers are confined in a quasi-zero dimensional structure in the partial silicon layer 32, i.e. a quantum dot.

The reservoir 11 and the quantum dot 10 can be coupled. The tunnelling rate can be adjusted by changing the separation between the first and second metallic layers 51, 52 and by modifying the applied biases. In another embodiment, the second metallic layer makes direct contact with the partial silicon layer, with no intermediate dielectric layer. This results in an ohmic region beneath the second metallic layer within the partial silicon layer. The ohmic region provides a charge carrier reservoir which is couplable to the quantum dot. In another embodiment, a tuning electrode provides tuneable coupling between the quantum dot and carrier reservoir. The coupling strength can be tuned by modifying a potential applied to the tuning electrode.

Figure 3:
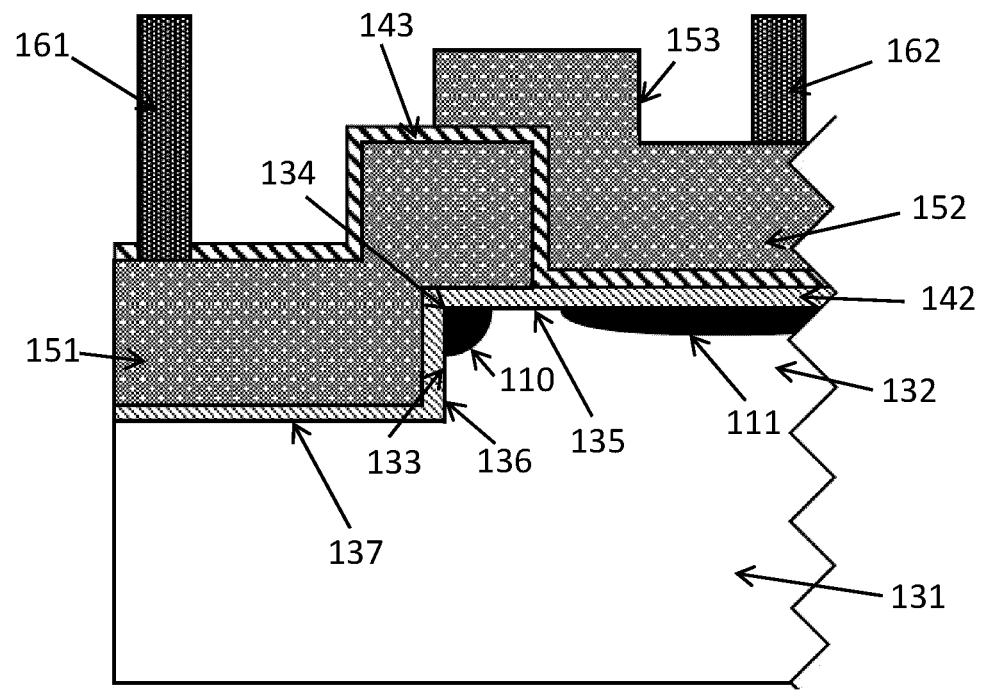
FIG. 3 is a cross-sectional side view of a silicon-based quantum device in accordance with a second embodiment of the invention.

FIG. 3 schematically illustrates a silicon-based quantum device according to a second embodiment. In this embodiment, a partial silicon layer 132 forms part of a silicon substrate 131. This is achieved by selectively etching a silicon wafer to form a step 133 with an edge 134. Similar to the first embodiment, the partial silicon layer 132 can extend beyond the portion of the device depicted in the figure. The stepped region provides a partial silicon layer 132. A first planar region 135 of the partial silicon layer 132 is substantially parallel to a second planar region 137 of the substrate 131. The first planar region 135 is in an un-etched region of the substrate 131, and the second planar region 137 is in an etched region of the substrate 131. The second planar region 137 is therefore offset from, and below, the first planar region 135. The step 133 comprises a vertical region 136 which is substantially vertical and orthogonal to the first and second planar regions 135, 137. A thin dielectric layer 142 is provided on top of the partial silicon layer 132 and the substrate 131, providing an electrically insulating layer.

Similarly to the first embodiment, the first and second metallic layers 151, 152 can be used to confine electrons or holes in confinement regions in the partial silicon layer 132. Application of a bias to the first and second metallic layers 151, 152 through the conductive vias 161, 162 results in couplable confinement regions 110, 111. The first and second metallic layers 151, 152 are electrically separate. However, contrary to the first embodiment in which electrical separation was achieved by a physical separation, in the second embodiment the first and second metallic layers 151, 152 are separated by a barrier dielectric layer 143 which forms an electrically insulating layer. The barrier dielectric layer 143 is formed from silicon dioxide, $SiO_2$. In alternative embodiments, the barrier dielectric layer may be formed from any suitable dielectric material such as aluminium oxide, hafnium dioxide, or zirconium silicate. The barrier dielectric layer 143 may be formed from the same material or a different material to the thin dielectric layer 142.

In FIG. 3, the second metallic layer 152 is positioned so as to overlap the first metallic layer 151. The second metallic layer 152 is deposited with an approximately uniform thickness and therefore the second metallic layer 152 comprises a step 153 where it overlies the first metallic layer 151. In another embodiment, there is no overlap between the first and second metallic layers 151, 152. However, due to the insulating properties of the barrier dielectric layer 143, a lateral separation is not required. The second metallic layer 152 is arranged to overly a portion of the first planar region 135 of the partial silicon layer 132. In a further embodiment, the second metallic layer 152 may be extended such that both the first and the second metallic layers are positioned overlying the step 134.

Figure 4:
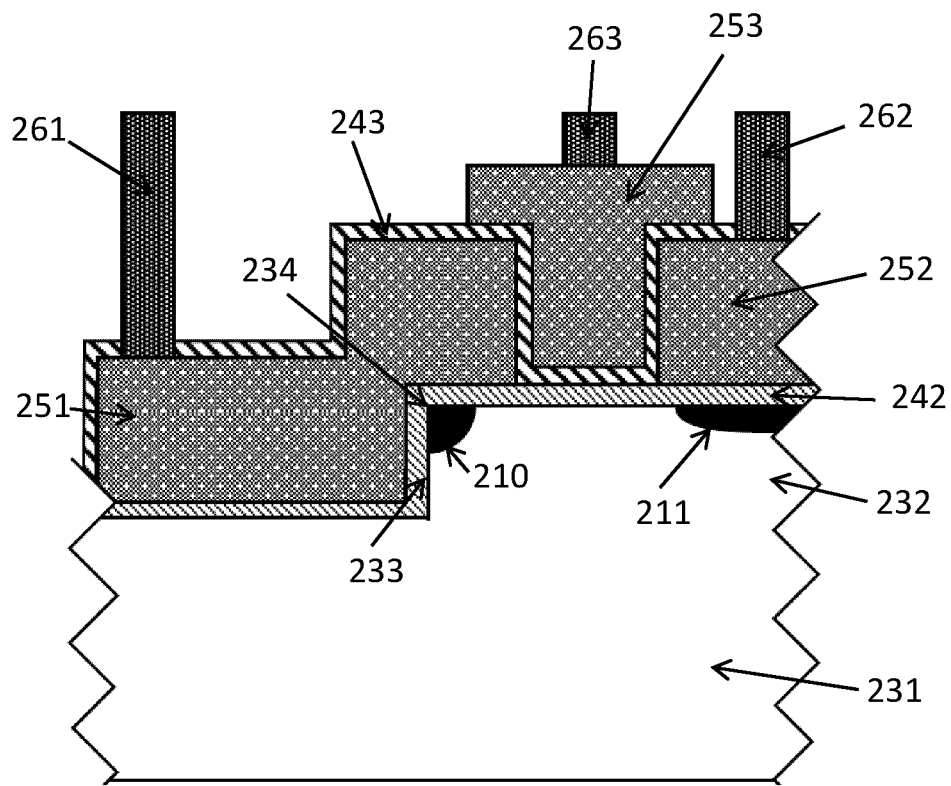
FIG. 4 is a cross-sectional side view of a silicon-based quantum device in accordance with a third embodiment of the invention.

FIG. 4 schematically illustrates a silicon-based quantum device according to a third embodiment. The substrate in this embodiment is similar to that of the second embodiment, comprising a partial silicon layer 232 which forms part of a silicon substrate 231. First and second metallic layers 251, 252 are provided on top of a first thin dielectric layer 242, and first and second conductive vias 261, 262 are electrically connected to the first and second metallic layers 251, 252 respectively. The first metallic layer 251 overlies the step 233 in the partial silicon layer 232. Charge can be confined in a first confinement region 210 at the edge 234 when a bias is applied to the first metallic layer 251. The second metallic layer 252 is provided on the partial silicon layer 232. Charge can be confined in a second confinement region 211 when a bias is applied to the second metallic layer 252.

The first and second metallic layers 251, 252 are spatially separated. A second thin dielectric layer 243 is provided such that it overlies the first and second metallic layers 251, 252. In this embodiment, a tuning metallic layer 253 forms a barrier electrode. The tuning metallic layer 253 is electrically connected to a via 263, and is provided overlying both of the first and the second metallic layers 251, 252. The tuning metallic layer 253 is arranged to be electrically communicative with, but electrically isolated from, both the first and second metallic layers 251, 252. A bias potential can be applied to the tuning metallic layer to control the strength of the coupling between the first and second confinement regions 210, 211.

Figure 5:
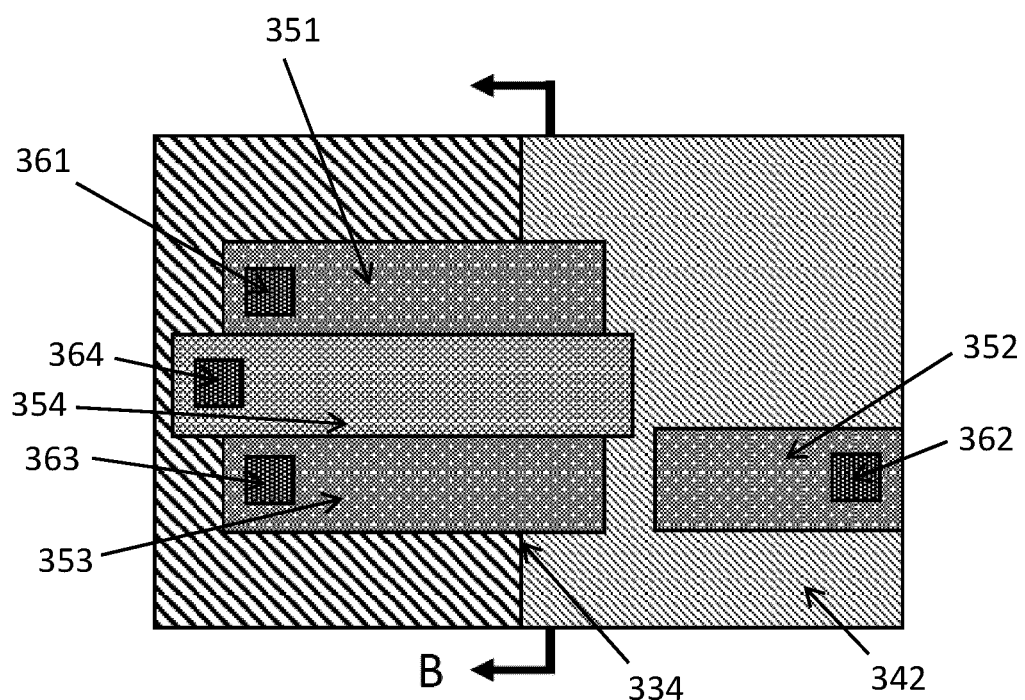
FIG. 5 is a top view of a silicon-based quantum device in accordance with a fourth embodiment of the invention.
Figure 6:
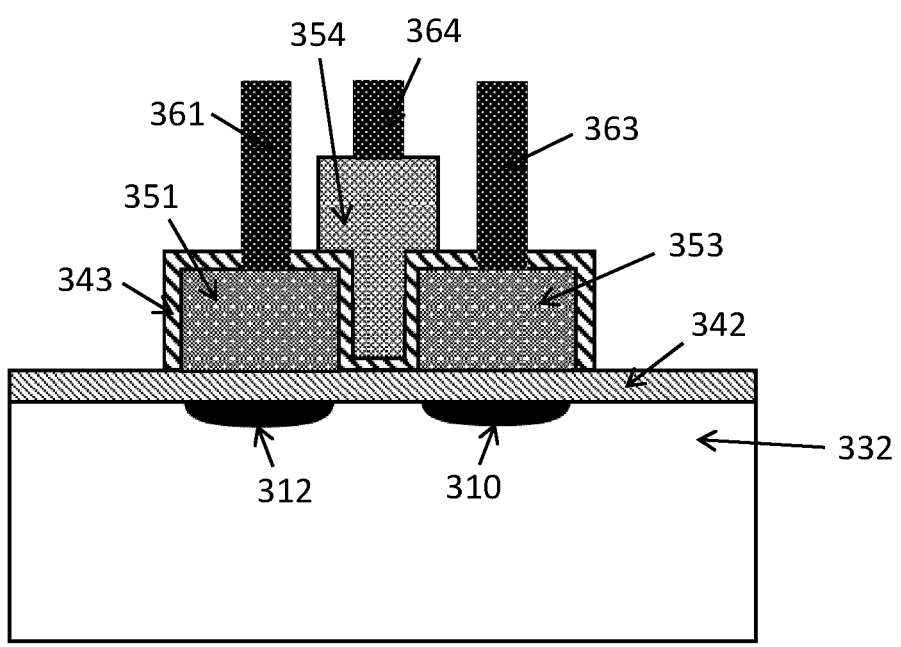
FIG. 6 is a cross-sectional side view of a silicon-based quantum device in accordance with the fourth embodiment of the invention.

FIGS. 5 and 6 schematically illustrate a silicon-based quantum device according to a fourth embodiment. FIG. 5 shows a top view and FIG. 6 shows a cross-sectional side view along the direction B indicated in FIG. 5. In this embodiment, first and second first metallic layers 351, 353, overly the edge 334 such that charge can be confined in first and second first confinement regions 312, 310 respectively. A second metallic layer 352 is provided on a thin dielectric layer 342, on a substantially flat portion of the partial silicon layer 332. In this embodiment, the second metallic layer 352 has substantially the same dimensions as each of the first metallic layers 351, 353. The second metallic layer 352 is arranged to be electrically connected such that a charge carrier reservoir (not shown) can be induced in the silicon layer 332 beneath the second metallic layer 352. The first and second first metallic layers 351, 353 and the second metallic layer 352 are electrically connected to respective conductive vias 361, 363, 362. The first and second first metallic layers 351, 353 are arranged to be electrically connected such that first and second quantum dots 312, 310 can be induced in the silicon layer 332 beneath the first and second first metallic layers 351, 353 respectively.

In this embodiment, a barrier dielectric layer 343 covers the first and second first metallic layers 351, 353. The barrier dielectric layer is not shown in FIG. 5 for clarity. A tuning metallic layer 354 is arranged on the barrier dielectric layer 343, positioned such that it overlies both the first and second first metallic layers 351, 353. The tuning metallic layer is electrically connected to a corresponding conductive via 364. The tuning metallic layer 354 is electrically isolated from the first and second first metallic layers 351, 353. A bias can be applied to the tuning metallic layer 354 to control the strength of the coupling between the first and second quantum dots 312, 310. First and second qubits may be supported by the first and second quantum dots 312, 310 respectively. The bias applied to the tuning metallic layer 354 could be used to couple the qubits such that a two-qubit interaction may be enabled between the first and second qubits, or could be used to decouple the qubits such that each of the first and second qubits may undergo one-qubit operations.

Figure 7:
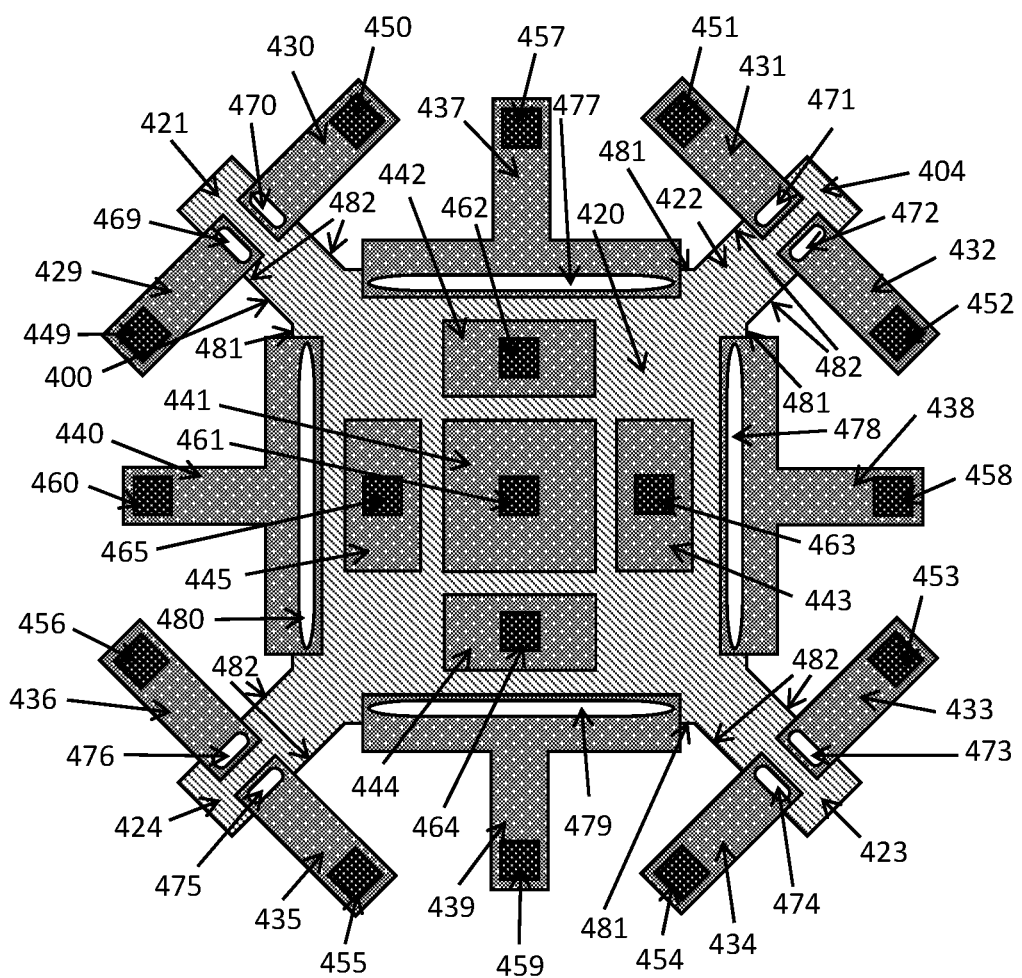
FIG. 7 is a top view of a silicon-based quantum device in accordance with a fifth embodiment of the invention.

FIG. 7 schematically illustrates a top view of a silicon-based quantum device in accordance with a fifth embodiment. The silicon-based quantum devices of the previous embodiments can be implemented in the fifth embodiment. The fifth embodiment depicts an exemplary portion of a possible two dimensional architecture comprising a plurality of quantum dots and elongate quantum dots. Elongate quantum dots are referred to as mediator dots. In use, each mediator dot can be directly coupled to a charge carrier reservoir. Each mediator dot can be further coupled to two quantum dots when the device is in use. This architecture provides a dense arrangement of quantum dots whilst ensuring that each quantum dot is close to a charge carrier reservoir. Each quantum dot is couplable to a charge carrier reservoir through a mediator dot. A quantum dot may be used to support a qubit. The qubit may be a data qubit used for carrying quantum information or an ancillary qubit. A mediator dot is used to provide a mechanism for quantum information exchange between qubits.

A silicon layer is selectively etched to form a partial silicon layer (not shown in a top view) with a central body 420 and arms 421, 422, 423, 424 extending radially from the body 420 forming a polygonal step 400 at the edge of the partial silicon layer with long edges 481 and short edges 482. In this embodiment the central body 420 is substantially square and forms a plateau region, and each of the four arms 421-424 extends from a corner of the square, forming a nanowire region. A thin dielectric layer 404 is provided on top of the partial silicon layer. Only the raised portion of the device is shown for clarity in FIG. 7. However, the silicon-based quantum device further includes a substrate (not shown) beneath the partial silicon layer. Two quantum dot metallic layers 429, 430, 431, 432, 433, 434, 435, 436 are provided on each arm 421-424. The quantum dot metallic layers 429-436 are third metallic layers which can be configured to induce corresponding quantum dots. The quantum dot metallic layers 429-436 are provided on the two short edges 482 of each arm 421-424. Four mediator dot metallic layers 437, 438, 439, 440 are provided on each edge 425, 426, 427, 428 of the central body 420. The mediator dot metallic layers 437-440 are first metallic layers which can be configured to induce corresponding elongate quantum dots. The mediator dot metallic layers 437-440 are provided on the long edges 481 of the central body 420. Five reservoir metallic layers 441, 442, 443, 444, 445 are provided on the central body 420. The first reservoir metallic layer 441 is provided in the centre of the central body 420, and each of the second to fifth reservoir metallic layers 442-445 is provided on the central body between the first reservoir metallic layer 441 and a corresponding mediator dot metallic layer 437-440. Each metallic layer 429-445 is in electrical contact with a corresponding conductive via 449, 450, 451, 452, 453, 454, 455, 456, 457, 458, 459, 460, 461, 462, 463, 464, 465.

The device is configured such that a bias potential can be applied to each of the conductive vias 449-465. When a bias is applied to a conductive via 449-465, electrons (or holes) can be trapped in the quantum confinement structures induced beneath the metallic layers 429-445 used for confining charge carriers. The dimensions of the metallic layers 429-445 and the bias applied are chosen such that a quantum dot 469, 470, 471, 472, 473, 474, 475, 476 can be induced in the partial silicon layer beneath each of the quantum dot metallic layers 429-436; a mediator dot 477, 478, 479, 480 can be induced in the partial silicon layer beneath each of the mediator dot metallic layers 437-440; and a charge carrier reservoir can be induced in the partial silicon layer beneath each of the reservoir metallic layers 441-445.

The sites of quantum dots 469-476 and the sites of mediator dots 477-480 are indicated schematically. The mediator dot metallic layers 437-440 are substantially wider than the quantum dot metallic layers 429-436, wherein the width is measured along the edge of the partial silicon layer. Each mediator dot 477-480 is an elongate quantum dot providing a tuneable link between two quantum dots 469-476. For example, the first mediator dot 477 can connect the second quantum dot 470 and the third quantum dot 471. Each mediator dot 477-480 is designed so as to provide a resonant transfer mechanism of exchange of quantum information between qubits. In order to achieve this, the width of the mediator dot metallic layers 437-440 is at least less than 1 micron in order to preserve the quantum information during an information exchange process. Although in principle the mediator dots 477-480 can be the same size as the quantum dots 469-476, the mediator dots 477-480 can have an elongate form in order to separate data qubits so as to provide a scalable architecture.

The architecture as depicted in FIG. 7 provides a dense arrangement of quantum dots whilst ensuring that each quantum dot is close to a charge carrier reservoir. Each mediator dot is directly coupled to a charge carrier reservoir, and each mediator dot is directly coupled to two quantum dots. The direct coupling is by proximity in this embodiment. In an alternative embodiment, tuning metallic layers may be provided as illustrated in FIGS. 4, 5 and 6 in order to provide electrode moderated coupling. This architecture provides several advantages over an architecture in which there can be a large number of quantum dots between reservoirs. Using the architecture of the fifth embodiment, qubits are easy to initialise due to the proximity of the reservoir to the quantum dots. Furthermore there is good charge stability, and the architecture is more resilient to charge errors. In addition, the proximity of each quantum dot to a charge carrier reservoir ensures that the population of the quantum dots can be maintained.

Each quantum dot site 469-476 can be occupied or unoccupied with a qubit such as an electron spin qubit. Therefore each arm 421-424 may support a double dot qubit, if both quantum dot sites are occupied, or a single dot qubit, if only one is occupied.

Figure 8:
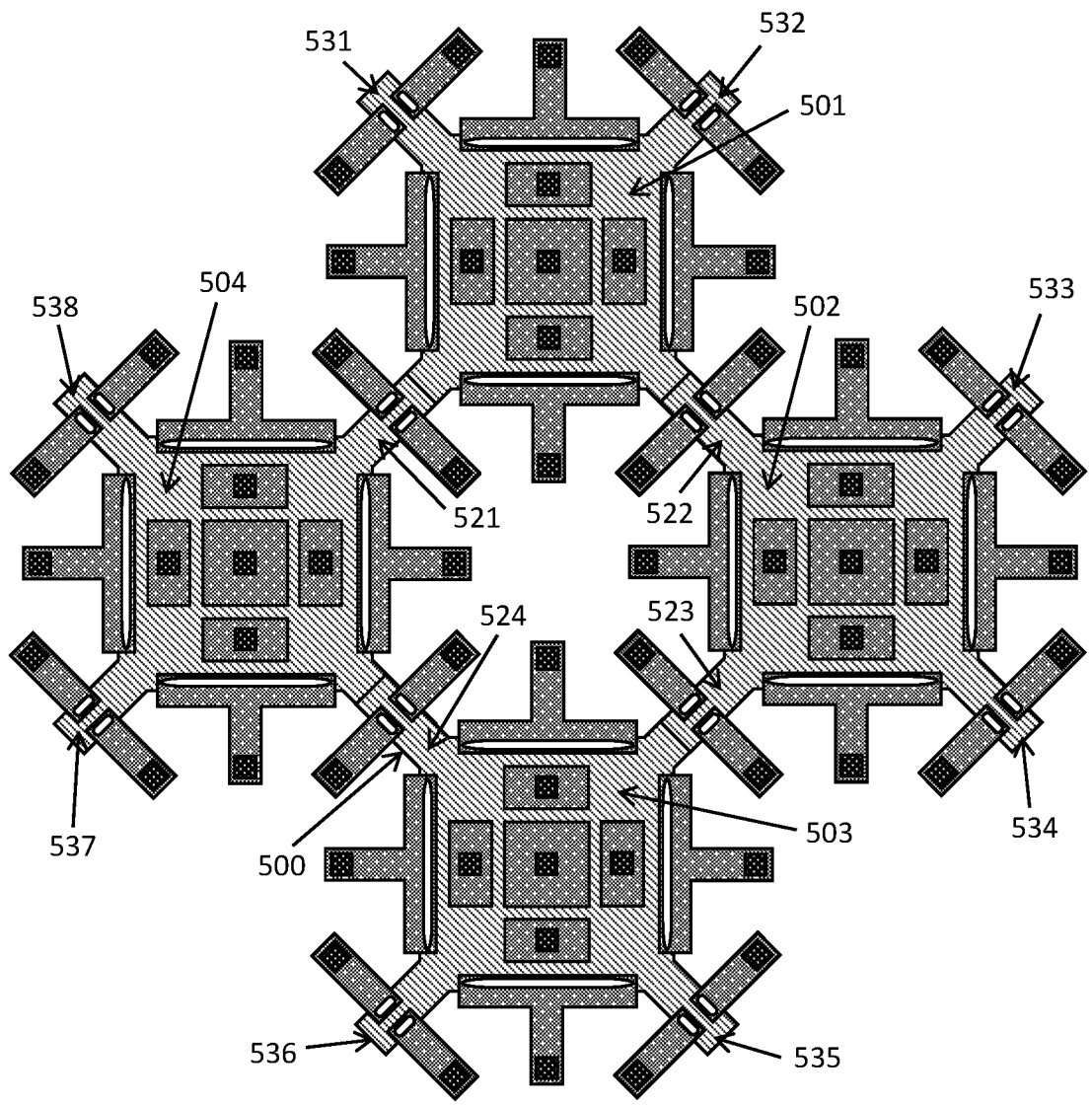
FIG. 8 is a top view of a silicon-based quantum device in accordance with a sixth embodiment of the invention.

FIG. 8 shows an expansion of the exemplary two dimensional architecture shown in FIG. 7. The unit illustrated in FIG. 7 can be repeated to scale up the device such that a series of central bodies 501, 502, 503, 504, or plateau regions, are connected by inner arms 521, 522, 523, 524, or nanowire regions. In FIG. 8, four central bodies 501-504 are depicted. However, the device architecture can be extended further using additional central bodies attached to outer arms 531, 532, 533, 534, 535, 536, 537, 538. The plurality of edges defined in the partial silicon layer form a polygonal step 500.

As will be appreciated, a quantum dot device is provided which enables a scalable two-dimensional architecture in which quantum dots can be coupled to charge carrier reservoirs to improve resilience to charge errors and to enable reliable quantum dot initialisation. Further advantages such as maintenance of quantum dot population and good charge stability arise as a result of the features of the quantum device. In addition a method for fabricating such a device and a method of using the device are also provided.

The invention claimed is:

1. A silicon-based quantum device for confining charge carriers, the device comprising:
   a substrate having a first planar region;
   a silicon layer which forms part of the substrate and includes a step with an edge and a second planar region, wherein the second planar region is substantially parallel to and offset from the first planar region;
   a first electrically insulating layer provided on the silicon layer, overlying the step;
   a first metallic layer, provided on the first electrically insulating layer, overlying the step, arranged to be electrically connected such that when a bias potential is applied to the first metallic layer, a first confinement region is induced in which a charge carrier or charge carriers are confined at the edge; and
   a second metallic layer, provided overlying the second planar region of the silicon layer, wherein the second metallic layer is:
   electrically separated from the first metallic layer; and
   arranged to be electrically connected such that when a bias potential is applied to the second metallic layer, a second confinement region is induced in which a charge carrier or charge carriers are confined only in the second planar region of the silicon layer under the second metallic layer, and the first confinement region is couplable to the second confinement region;

wherein the first confinement region is displaced from the second confinement region in a direction that is perpendicular to the edge.

2. A silicon-based quantum device according to claim 1, wherein the second metallic layer is provided on the first electrically insulating layer.

3. A silicon-based quantum device according to claim 1, wherein the second metallic layer is displaced from the first metallic layer in a direction that is perpendicular to the edge.

4. A silicon-based quantum device according to claim 1, wherein a second electrically insulating layer is provided on the first metallic layer, and the second metallic layer is provided on the second electrically insulating layer.

5. A silicon-based quantum device according to claim 1, wherein the first confinement region is couplable to the second confinement region with a tuneable coupling strength, and the device further comprises:

a first tuning metallic layer positioned between the first metallic layer and the second metallic layer;

wherein the first tuning metallic layer is electrically isolated from the first metallic layer and the second metallic layer; and wherein the first tuning metallic layer is operable to tune the coupling strength between the first confinement region and the second confinement region.

6. A silicon-based quantum device according to claim 1, further comprising:

a first first metallic layer arranged to be electrically connected so as to induce a first first confinement region;

a second first metallic layer, electrically separated from the first first metallic layer and arranged to be electrically connected so as to induce a second first confinement region; and a second tuning metallic layer, provided between the first first metallic layer and the second first metallic layer, and electrically separated from the first first metallic layer and the second first metallic layer;

wherein the first first confinement region is couplable to the second first confinement region with a tuneable coupling strength; and wherein the second tuning metallic layer is operable to tune the coupling strength between the first first confinement region and the second first confinement region.

7. A silicon-based quantum device according to claim 1, wherein a third electrically insulating layer is provided beneath the silicon layer.

8. A silicon-based quantum device according to claim 1, wherein the first metallic layer and the second metallic layer are in electrical contact with a first conductive via and a second conductive via respectively.

9. A silicon-based quantum device according to claim 1, wherein the first metallic layer extends laterally along the edge such that an elongate quantum dot can be induced at the edge in a first confinement region.

10. A silicon-based quantum device according to claim 9, wherein the step comprises at least a first edge and a second edge, wherein the first edge and second edge subtend a non-zero angle with respect to one another; wherein the first metallic layer overlies the first edge of the step and is arranged to be electrically connected such that an elongate quantum dot can be induced in a first confinement region at the first edge; and wherein the device further comprises:

a third metallic layer, provided on the first electrically insulating layer, overlying the second edge of the step, arranged to be electrically connected such that a quantum dot can be induced in a first confinement region at the second edge.

11. A silicon-based quantum device according to claim 10, further comprising a plurality of first metallic layers configured to support corresponding elongate quantum dots at respective edges of the step in the silicon layer and a plurality of third metallic layers configured to support corresponding quantum dots at respective edges of the step in the silicon layer, and wherein each first metallic layer is adjacent to two separate third metallic layers such that each elongate quantum dot is couplable to two quantum dots.

12. A method of assembling a silicon-based quantum device according to claim 1, comprising the steps of:

providing a substrate having a first planar region;

etching the substrate to form a silicon layer including a step with an edge and a second planar region, wherein the second planar region is substantially parallel to and offset from the first planar region;

depositing a first electrically insulating layer on the silicon layer, overlying the step;

depositing a first metallic layer on the first electrically insulating layer, overlying the step, wherein the first metallic layer is configured to be electrically connected such that when a bias potential is applied to the first metallic layer, a charge carrier or charge carriers are confined in a first confinement region at the edge; and depositing a second metallic layer on the second planar region of the silicon layer, wherein the second metallic layer is configured to be electrically separated from the first metallic layer and to be electrically connected such that when a bias potential is applied to the second metallic layer, a charge carrier or charge carriers are confined in a second confinement region only in the second planar region of the silicon layer under the second metallic layer, and the first confinement region is couplable to the second confinement region.

13. A method of assembling a silicon-based quantum device according to claim 12 wherein the steps of depositing the first metallic layer and the second metallic layer are performed simultaneously.

14. A method of assembling a silicon-based quantum device according to claim 12, further comprising the step of:

depositing a second electrically insulating layer on the first metallic layer; and wherein the second metallic layer is provided on the second electrically insulating layer.

15. A method of using a silicon-based quantum device according to claim 1, comprising the steps of:

applying a first bias potential to the first metallic layer to confine a charge carrier or charge carriers in a first confinement region; and applying a second bias potential to the second metallic layer to confine a charge carrier or charge carriers in a second confinement region, wherein the second confinement region is only in the second planar region of the silicon layer under the second metallic layer;

wherein the first bias potential and the second bias potential are configured such that the first confinement region and the second confinement region are coupled.

* * * * *